United States Patent [19]

Clifford, Jr. et al.

[11] Patent Number: 5,847,902
[45] Date of Patent: Dec. 8, 1998

[54] HEAD SUSPENSION ASSEMBLY HAVING PARALLEL-COUPLED LOAD/GIMBAL SPRINGS

[75] Inventors: George M. Clifford, Jr., Los Altos Hills; Richard H. Henze, San Carlos; Carol J. Wilson, Sunnyvale, all of Calif.

[73] Assignee: Hewlett-Packard Company, Palo Alto, Calif.

[21] Appl. No.: 907,568

[22] Filed: Aug. 8, 1997

Related U.S. Application Data

[63] Continuation of Ser. No. 321,498, Oct. 12, 1994, abandoned.

[51] Int. Cl.⁶ .............................. G11B 5/60; G11B 21/21
[52] U.S. Cl. ............................................................ 360/104
[58] Field of Search .................................. 360/104, 103, 360/105, 109

[56] References Cited

U.S. PATENT DOCUMENTS

| | | | |
|---|---|---|---|
| 4,761,699 | 8/1988 | Ainslie et al. | 360/103 |
| 4,786,999 | 11/1988 | Tanaka et al. | 360/104 |
| 4,876,623 | 10/1989 | Takekado | 360/104 |
| 4,943,881 | 7/1990 | Isozaki et al. | 360/104 |
| 5,103,359 | 4/1992 | Marazzo | 360/104 |
| 5,124,864 | 6/1992 | Matsuzaki | 360/104 |
| 5,166,845 | 11/1992 | Thompson et al. | 360/103 |
| 5,198,934 | 3/1993 | Kubo et al. | 360/104 |
| 5,198,945 | 3/1993 | Blaeser et al. | 360/104 |
| 5,282,102 | 1/1994 | Christianson | 360/104 |
| 5,299,081 | 3/1994 | Hatch et al. | 360/104 |

FOREIGN PATENT DOCUMENTS

| | | | |
|---|---|---|---|
| 71249 | 2/1983 | Japan | 360/103 |
| 60-50778 | 3/1985 | Japan | 360/103 |
| 63-86150 | 4/1988 | Japan | 360/104 |
| 3-127388 | 5/1991 | Japan | 360/104 |
| WO8908307 | 9/1989 | WIPO . | |

OTHER PUBLICATIONS

"Silicon Arms for DASD", Research Disclosure, Feb. 1985, #250.

Denny K. Miu, Shuyun Wu, Viktoria Temesvary, Yu–Chong Tai, "Silicon Microgimbals for Super–Compact Magnetic Recording Rigid Disk Drives", Advances in Information Storage Systems, vol. 5, pp. 139–152.

Viktoria Temesvary, Shuyun Wu, Wen H. Hsieh, Yu Chong Tai, and Denny K, Miu, "Design, Fabrication, and Testing of Silicon Microgimbals for Super–Compact Rigid Disk Drives", Journal of Microelectromechanical Systems, vol. 4, No. 1, Mar. 1995, pp. 18–26.

*Primary Examiner*—Robert S. Tupper

[57] ABSTRACT

A magnetic head suspension assembly and method are designed to include a substantially inflexible support arm mounted at one end to an actuator motor in a data storage disk drive system. At the opposite end of the support arm is a gimbal. An air bearing slider having at least one read/write head is connected to the gimbal. The gimbal is adapted to accommodate pitch and roll motion and is compliant in the direction perpendicular to a surface of the data storage medium to be read. The gimbal is parallel-coupled with a load spring that is connected to the support arm to apply a load force. This arrangement improves the shock-resistance characteristics of the suspension assembly, since the support arm does not add to the inertial force caused by accelerations from shock events. In a preferred embodiment, the electrical connection to the read/write head is via electrical traces that are printed onto the support arm and gimbal. Traces are also formed on the gimbal springs to extend to a solder-reflow location at an interface to the slider.

10 Claims, 6 Drawing Sheets

HEAD SUSPENSION ASSEMBLY HAVING PARALLEL-COUPLED LOAD/GIMBAL SPRINGS

CROSS REFERENCE TO RELATED APPLICATION

This is a continuation of application Ser. No. 08/321,498 filed on Oct. 12, 1994, now abandoned.

TECHNICAL FIELD

The invention relates generally to reading and writing data on a magnetic storage medium and more particularly to suspension systems for supporting a read/write transducer.

BACKGROUND ART

In transferring data to and from a magnetic storage medium, such as a magnetic disk, a read/write transducer is either mounted or fabricated onto an air bearing slider that is brought into close proximity to the medium. The slider is separated from the disk by an air bearing that is generated between the slider and the rotating disk. Thus, the air bearing slider moves relative to the disk surface in a flying mode. This air bearing makes it possible for an actuator to position the read/write transducer over various circumferential data tracks on the magnetic disk. The slider-to-disk spacing is controlled by the load force provided by the suspension assembly; that is, the suspension assembly opposes the aerodynamic lift force of the air bearing. Some air bearing sliders generate negative pressure over a portion of the air bearing surface to increase the effective load force. Conventionally, the air bearing slider forms part of this suspension assembly that is mounted to an actuator arm of an actuator motor. The suspension assembly also includes a load beam and a gimbal to link the slider to the actuator arm.

There are a number of stiffnesses that must be considered in the design of a suspension assembly for a read/write transducer, or head. First, the suspension assembly must have low pitch and roll stiffnesses, so that angular misalignment between the air bearing slider with respect to the disk surface is decoupled. A prior art suspension assembly 100 is shown in FIG. 1. The term "roll" is defined herein as rotation about the Y axis that is generally parallel to the length of the assembly. "Pitch" is defined as rotation about the X axis.

Slider-to-disk angular misalignment may be caused by a nonplanar disk topography or by inexactness in the drive assembly, such as lack of parallelism between the suspension mounting surface relative to the disk surface. The angular misalignment transmits a moment to the air bearing, which could alter the flying characteristics of the slider 102. In the suspension assembly, a gimbal 104 is used to decouple the angular misalignment of the air bearing slider with respect to the disk surface. The gimbal may include a load dimple, not shown, upon which the slider pivots, but other arrangements are possible.

Other stiffnesses of concern in the design of a suspension assembly 100 are in-plane stiffnesses. While the gimbal 104 allows the slider 102 to have rotational compliance with respect to the disk surface, the remainder of the suspension assembly must be stiff with respect to in-plane movement along the X axis and the Y axis, as well as in-plane rotation, i.e. "yaw," rotation about the Z axis. Ensuring high in-plane stiffnesses is important for achieving reliable track servo operation, for overcoming the frictional forces that occur between the slider and the disk surface during takeoff and landing, and for limiting slider motions in a down-track direction that could translate to timing jitter during data recovery.

Vertical stiffness is another important consideration. Vertical stiffness, that is "Z-axis stiffness," is used to produce the vertical force which maintains the desired head-to-disk spacing.

The suspension arm that links the air bearing slider 102 to the actuator arm of the actuator motor may be a single piece member, formed of approximately 75 $\mu$m thick stainless steel sheet, having a number of regions. The regions include a mounting region 106 for attachment of the suspension arm to the actuator arm. Also shown in FIG. 1 is a bend region 108 near the mounting region. The bend region straightens when the air bearing slider is loaded onto a disk, thereby generating the Z-axis spring load force on the back of the slider. Current production sliders are of a form sometimes referred to as "50% sliders" and operate with a nominal load of 2–5 grams force.

In effect, the bend region 108 of the suspension arm is a spring element that is referred to as the load spring. Ideally, it is used to apply a constant force to the back of the slider 102. However, in practice variations in the load force occur, but the load force remains within an acceptable range because the bend region has a low vertical spring rate. A general guideline specifies that a ±0.125 mm variation of the suspension base mounting height, i.e., the "Z-height tolerance," should not change the load force by more than 10% of the nominal load value. Product-specific values are determined by the air bearing stiffness, product requirements (such as flying height) and by manufacturing tolerances.

In addition to the mounting and bend regions 106 and 108, a conventional suspension arm includes a load beam region 110. Conventionally, this region is quite stiff; for example, the stainless steel sheet used to form the arm may have stiffening ribs 112 and 114 along opposite sides to increase rigidity. At the end of the load beam region opposite to the bend region is the gimbal 104.

There are two prominent gimbal approaches. In the first approach, the gimbal has a high Z-axis stiffness. This enables the gimbal to transmit the load force directly to the slider with very little vertical deflection. This approach typically includes forming the gimbal, which can be etched thinner, to be integral with the load beam. That is, the gimbal and the load beam are formed from the same sheet of material. U.S. Pat. Nos. 5,282,102 to Christianson and 5,198,945 to Blaeser et al. describe this approach. It is also possible to implement this first approach using a multi-piece assembly, with some pieces being formed of other metals or non-metals, such as polyimide or silicon.

In the other of the two predominant gimbal approaches, the gimbal may be formed from a thinner sheet stock than the stainless sheet of the load beam and bend regions. The gimbal is spot welded or otherwise attached to the load beam. In this second approach, the gimbal is more compliant in the Z-direction. The load force is provided by the remainder of the suspension assembly and is transmitted to the air bearing slider via a load dimple that is formed on the gimbal or load beam. The load beam tip acts to constrain the gimbal's vertical deflection, essentially making the gimbal vertically stiff. The dimple defines the load point of the applied force. U.S. Pat. No. 5,299,081 to Hatch et al. describes a gimbal that utilizes this second approach. Suspension assembly designs using this second approach are generally capable of larger pitch and roll compliance than the first approach.

There are difficulties associated with this second approach when the suspension assembly/gimbal is subjected to seek-induced or externally supplied shocks. Large lateral shock can cause small scale slipping between the load dimple and the load beam. This lateral head shift with respect to the suspension arm may be held by the static friction between the dimple and the load beam, resulting in a change in the loading point of the air bearing load force. The lateral head shift is particularly undesirable in dedicated servo disk drives, because it results in the relative misalignment of the heads in a multiple platen disk drive. In addition, large vertical shocks can overcome the load force, causing the slider to separate from the disk. When this occurs during the shock event, the gimbal arrangement may allow the air bearing surface to become oriented at an excessive angle relative to the disk surface. After the shock event, the load spring will reestablish proximity between the slider and the disk, but the angular misalignment between the air bearing surface and the disk surface may prevent the reformation of the desired slider/disk air bearing interface. It is possible that a corner of the slider will impinge the disk, causing loss of data and/or damage to either the disk or the slider.

Because the first gimbal approach is associated with a high vertical stiffness, it prevents the large angular misalignments which could occur with the second gimbal approach during shock events. Moreover, since there is no dimple associated with this first approach, the difficulties occurring due to lateral head shift should be eliminated. Nevertheless, damage and data loss resulting from shock events remain a concern because there is still a substantial inertial mass which can unload the slider, potentially causing it to impact the disk.

Another concern is that suspension assemblies designed with either of the two gimbal approaches discussed above may be indetectably flawed. When formed of metal, the gimbals can be unintentionally damaged during assembly of the slider to the gimbal and during subsequent handling. The damage may cause the gimbal to deform plastically, resulting in undesired moments being transmitted to the slider. The magnitude of the plastic deformation may be small enough that it is difficult or costly to detect, but large enough to alter the slider flying characteristics beyond a tolerable level.

In addition to the mechanical requirements, the suspension assembly typically is required to support electrical conductors which carry data signals to and from the read/write head. These conductors are typically coated wires; however, some suspension assembly configurations utilize flex circuits to pass the signals along the suspension arm. These wires are routed between the load beam and slider in what are known as service loops. Ideally, service loops are designed so that they produce no moments on the disk and do not interfere with the disk. However, in some instances, these service loops will contact the disk, causing damage to the disk, wires or both. At the end of the suspension assembly opposite to the slider, there is typically a flex circuit that extends the conductors to the drive electronics. As an improvement to suspension assemblies having twisted wires extending to a slider, U.S. Pat. No. 4,761,699 to Ainslie et al. describes forming electrical traces on a suspension and then both mechanically and electrically connecting the suspension to a slider by reflowing solder balls formed at contact pads.

There are two conflicting trends in the art of designing suspension assemblies for read/write heads of magnetic storage devices. First, sliders are decreasing in size. The reduction in slider size aids in decreasing the flying height of a slider and facilitates improvements in the production economies at the slider wafer fabrication stage. The smaller size provides a corresponding reduction in mass, which reduces the inertia of the system. The reduction in mass improves the seek performance and shock performance of the system. However, the decrease in the size of the slider impedes the ability of the slider to remain unaffected by undesired applied moments, since the reduction in size results in a reduced air bearing stiffness.

The second trend is the increase in the number of electrical leads which are being attached to the slider. This trend increases the potential creation and magnitude of undesired moments being applied to the slider. Typically, two conductors have been soldered to small pads on the rear surface of the slider. When these conductors are attached to the slider, care must be taken to ensure that the conductors do not apply an appreciable moment to the slider. This adds to the complexity and expense of the assembly process. With the introduction of magneto-resistive read sensors and/or other advanced transducer schemes, there is a need for more than two electrical conductors, so the potential for the creation of additional moments increases.

In addition to the above trends, there is another convention applied to the load and gimbal springs which is maintained by the industry. With either of the two gimbal arrangements described above, the load force is produced in the bend region of the suspension arm and is applied through the load beam and vertically stiff gimbal to the slider at the opposite end of the suspension arm. Thus, in effect, the load and gimbal springs are in a series arrangement. In this series-coupled spring configuration, the vertical compliance of the load spring and that of the gimbal are added to obtain the total system compliance. The inverse of this total system compliance yields the system stiffness, which is multiplied by the total loading deflection to define the load force. In practice, the load spring is significantly less stiff in the vertical direction than is the gimbal, so that the load spring governs the magnitude of the load force. During a vertical shock event, a significant portion of the mass of the suspension arm combines with the two masses of the slider and the gimbal to create the inertial force applied to the load spring. The trend of reducing the size of the slider, as mentioned above, leads to decreases in this inertial force, but the system is still susceptible to damage as a result of vertical shocks.

The industry needs a magnetic head suspension assembly and method that decrease the susceptibility of a data reading system to damage or data loss resulting from external shocks. Such an assembly and method should address the problems associated with the wires attached to the slider. These problems include undesired moments applied to the slider and wire service loop damage which can occur to the disks and wires.

SUMMARY OF THE INVENTION

The invention is a magnetic head suspension assembly and method having a slider-supporting gimbal arrangement attached to a gimbal end of an inflexible support arm, with parallel-coupled load and gimbal springs combining to apply a load force to an air bearing slider attached to the gimbal. As will be explained below, the gimbal is structured to accommodate certain slider movements, while providing a high stiffness with respect to motions in other directions. Because the support arm is substantially inflexible, the mass of the support arm is not a key factor in determining the inertial force generated by acceleration during a shock event.

In a preferred embodiment, the gimbal includes a frame that encloses a gimbal pendant. The structure that joins the gimbal pendant to the frame defines the "gimbal springs."

The air bearing slider is attached to the gimbal pendant allowing motion relative to the frame and the inflexible support arm. The gimbal springs accommodate pitch and roll motion of the air bearing slider, but have high in-plane stiffness. That is, while the slider is able to rotate about X and Y axes that are parallel to the surface of a data storage medium, the gimbal springs resist linear movement along the X and Y axes.

The inflexible support arm has a first end, or mounting end, connected to a drive system. For example, the mounting end may be connected to an actuator arm of an actuator motor. The frame is connected at the opposite second end, or gimbal end, of the support arm.

One end of a load spring is connected to the inflexible support arm and the other end is in contact with the gimbal pendant. The gimbal has a low stiffness normal to the surface of the data storage medium, i.e. the gimbal is compliant in the Z-direction. An ideal gimbal would be one having no stiffness in this Z-direction, but some stiffness is inherent. The gimbal springs and the load spring act in parallel in the Z-direction to determine the load force that substantially defines the flying characteristics of the slider. That is, the vertical spring stiffnesses of the gimbal springs and the load spring add together to provide the total vertical stiffness for controlling the air bearing slider that has at least one read/write head.

The load spring may be a long, thin member, such as a beam, wire or spring, that is attached at one end to the inflexible support arm. At the opposite end, the load spring may be positioned near a dimple of the gimbal pendant. The dimple locates the load point with respect to the air bearing slider. The height of the dimple and the interaction between the dimple and the load spring should be such that no undesired moments are applied to the slider. Ideally, the tip of the dimple resides in the plane of the gimbal springs to eliminate any moments due to side (or frictional) forces. As an alternative, the dimple may be formed on the load spring.

For the embodiment in which the load spring is a plate spring, this element may have mounting, bend and straight regions. The mounting region is attached to the support arm. The bend region may have dimensions designed to determine the flex characteristics of the load spring. For example, the load spring may be thinner or narrower at the bend region. Preferably, the bend region is proximate to the mounting region. The straight region has a stiffness that is capable of transferring the load force from the bend region to the air bearing slider without appreciable deformation.

In a second embodiment, the load spring is attached to the inflexible support arm near the gimbal. This may be referred to as a "localized configuration." Optionally, deflection of the load spring may be constrained to permit only motion in the Z-direction. With motion being constrained in this manner, the load spring can be attached directly to the load point of the slider or gimbal, since there is a reduced possibility of applying undesired moments to the air bearing slider.

The inflexible support arm may be formed of a ceramic material. The load spring may be a metal, such as nickel, nickel-cobalt, or an ultra-high strength steel. Alternatives for forming the load spring include electroforming, precision stamping and chemical etching.

Optionally, the load spring and the gimbal may be formed in a unitary manner. That is, a single spring may be formed to provide the Z-direction load force, the pitch and roll compliance, and the in-plane and yaw stiffnesses.

The gimbal is preferably a silicon device that is configured using micromachining fabrication processes. Silicon is attractive because of the high precision tolerances available in the fabrication of microdevices and because of the non-plastic behavior of silicon at operating temperature ranges. A properly fabricated silicon gimbal is resistant to plastic deformation and fracture during assembly. Moreover, if a silicon gimbal is fractured, the fracture is relatively easy to detect, as compared to yield damage of conventional metallic gimbals.

Preferably, electrical connections to read/write heads include circuit traces along the inflexible support arm. Electrical traces can be incorporated onto the support arm using known techniques for forming conductive film circuits on ceramic substrates. The electrical traces connect to metallized traces on the silicon gimbal. The gimbal traces extend across a gimbal spring to a central gimbal pendant. From the gimbal pendant, the interconnection of electrical traces on the slider can be accomplished by means of solder reflow, conventional wire bonding techniques, or conductive adhesive. Reflow of solder bumps is attractive for this application, since solder reflow provides a degree of self-alignment between the components, in addition to providing the electrical interconnection.

The invention offers advantages of enhanced resistance to shock, a high repeatability of assembly alignment, and an improved method of establishing electrical connection. The shock-resistance characteristics are improved by reducing the mass that creates the inertial force caused by acceleration during a shock event. By replacing the conventional load beam with a rigid support arm, larger shock accelerations can be tolerated without occurrence of slider-to-disk separation. Repeatability of assembly alignment between the gimbal pendant and the mounting surface of the suspension is improved, since the gimbal is attached directly to an inflexible support arm, rather than to a load beam. In embodiments in which flip-chip type solder bump interconnects are used to join the gimbal to the support arm, the self-alignment properties associated with the flip-chip process contribute to the repeatability of the assembly alignment. In the flip-chip process, the components are placed in proximity such that corresponding bond pads of the mating components overlap. Upon reflow of the solder, surface tension of the liquid solder pulls the components into relatively close alignment. This self-alignment between the slider and the gimbal pendant locates the load force with respect to the air bearing features and the gimbal spring. Moreover, electrical components, such as preamplifiers, may be flip-chip mounted directly onto a rigid ceramic support arm.

The invention provides an improved manner of incorporating electrical connections. The parallel configuration of the gimbal and load spring removes the load spring from the path of the electrical traces. Within the prior art, any traces that are fabricated along the length of a load beam are subjected to the same deformation as the load beam. Trace continuity is repeatedly jeopardized by the stresses generated during deformation. In the invention, no traces are formed on the load spring itself. Rather, traces are formed on the inflexible support arm. While the electrical traces of the invention are preferably integrally formed along the gimbal, the circuit path is substantially removed from components that undergo a large amount of deformation.

BEST MODE FOR CARRYING OUT THE INVENTION

Figure 2:
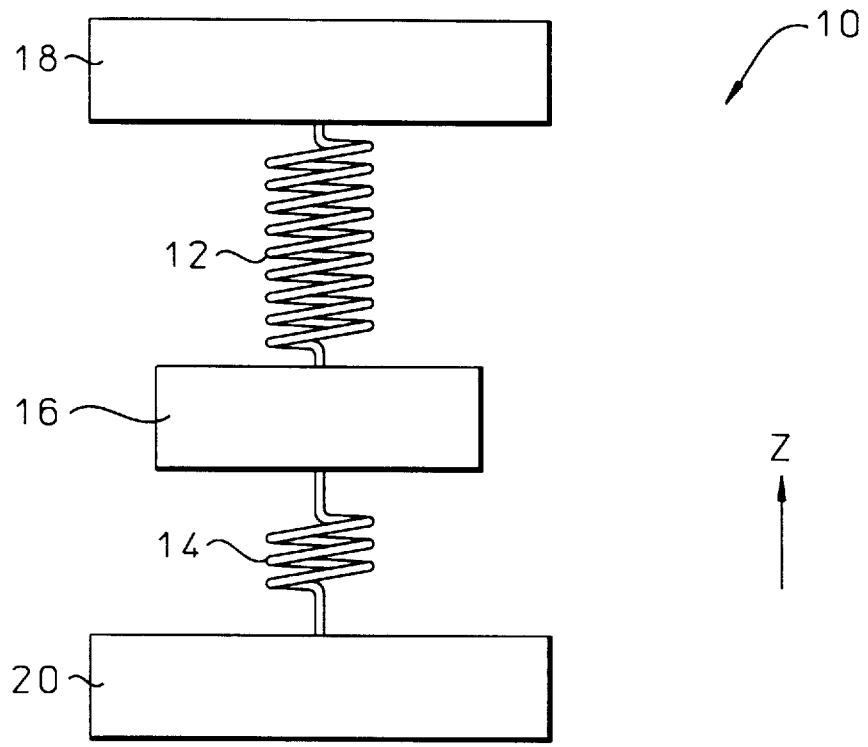
FIG. 2 is a schematic view of a prior art series-coupled spring arrangement for applying vertical forces onto an air bearing slider.

With reference to FIG. 2, a prior art suspension assembly 10 can be represented as a load spring 12 that is series-coupled with a gimbal spring 14. As defined herein, "gimbal spring" refers to the effective stiffness of a gimbal in the vertical direction, i.e. Z-direction. The load spring 12 connects the effective mass of a load beam 16 to a drive system 18. The effective mass denotes that portion of the mass that contributes to the generation of inertial forces during acceleration caused by a shock event.

Figure 1:
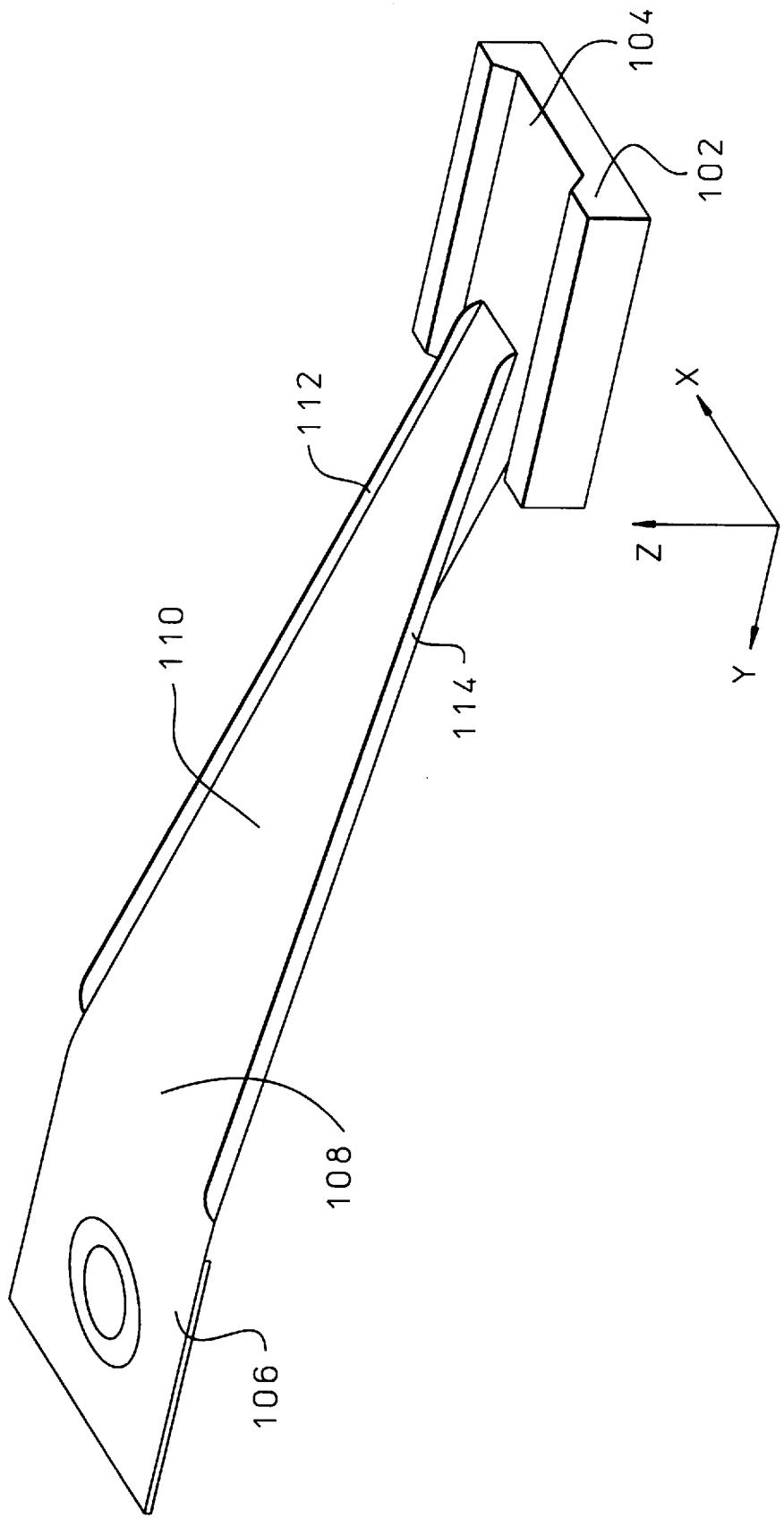
FIG. 1 is a perspective view of a prior art suspension assembly, and an illustration of the orientations of axes of interest.

The drive system 18 may be an actuator arm of an actuator motor. The load spring 12 represents a bend region of a prior art suspension arm, such as the bend region 108 of the suspension assembly 100 of FIG. 1. The bend region is at an end of a load beam region 110 opposite to a gimbal 104. A mass 20 of FIG. 2 represents the mass of a gimbal and an air bearing slider. In the prior art design of FIG. 2, which represents many systems presently in use, the effective mass of the load beam 16 contributes approximately 50% of the total shock inertial force, with the mass 20 contributing approximately 50%.

Figure 3:
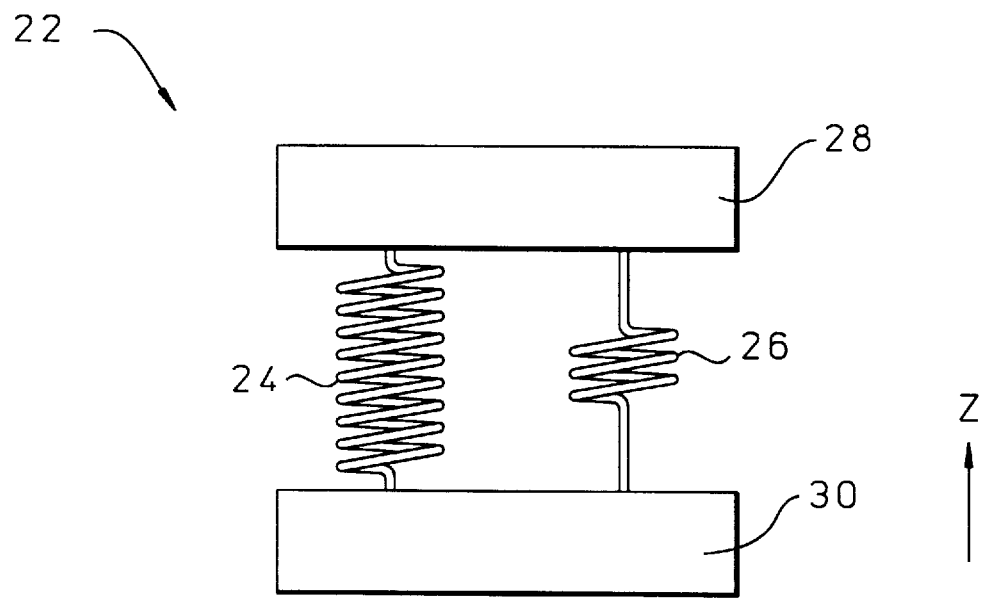
FIG. 3 is a schematic view of the application of parallel-coupled vertical forces onto an air bearing slider in accordance with the invention.

Referring now to FIG. 3, a suspension assembly 22 in accordance with the invention provides a parallel coupling of a load spring 24 and a gimbal spring 26, i.e. stiffness of the gimbal with respect to the Z-direction. Rather than a suspension arm that includes a bend region that defines the load spring and a load beam region, the suspension assembly 22 includes an inflexible support arm and a structurally separate load spring 24. In FIG. 2, the vertically stationary region is the drive system 18, and the mass 20 of the slider and gimbal is vertically displaceable. With respect to the vertically stationary drive system, FIG. 2 illustrates two components of displacement of the mass 20. The first component is a result of flexure at the load spring 12 that links the effective mass of the load beam 16 to the drive system. The second component is a consequence of flexure of the gimbal spring 14 that connects the mass 20 of the slider and gimbal to the mass of the load beam. In comparison, the suspension assembly 22 of FIG. 3 includes an inflexible support arm, so that the mass 28 that is vertically stationary comprises both the drive system and the support arm of the suspension assembly. A displaceable mass 30 is connected at the ends of the load and gimbal springs 24 and 26 opposite to the vertically stationary mass. There is a single component of displacement. The displaceable mass 30 includes the mass of a slider and an effective mass of a gimbal. An effective mass of the load spring must be added to the mass 30 to some degree, but the series-coupled spring arrangement of FIG. 2 does not apply, as will be explained more fully below.

Still comparing FIGS. 2 and 3, the effective mass of the load beam 16 plays an important role in determining the inertial force generated during a vertical shock event encountered by the prior art suspension assembly 10 of FIG. 2. However, in FIG. 3, the inflexible support arm does not contribute significantly to the total shock inertial force. Consequently, the shock-resistance characteristics of the suspension assembly 22 are superior.

Figure 4:
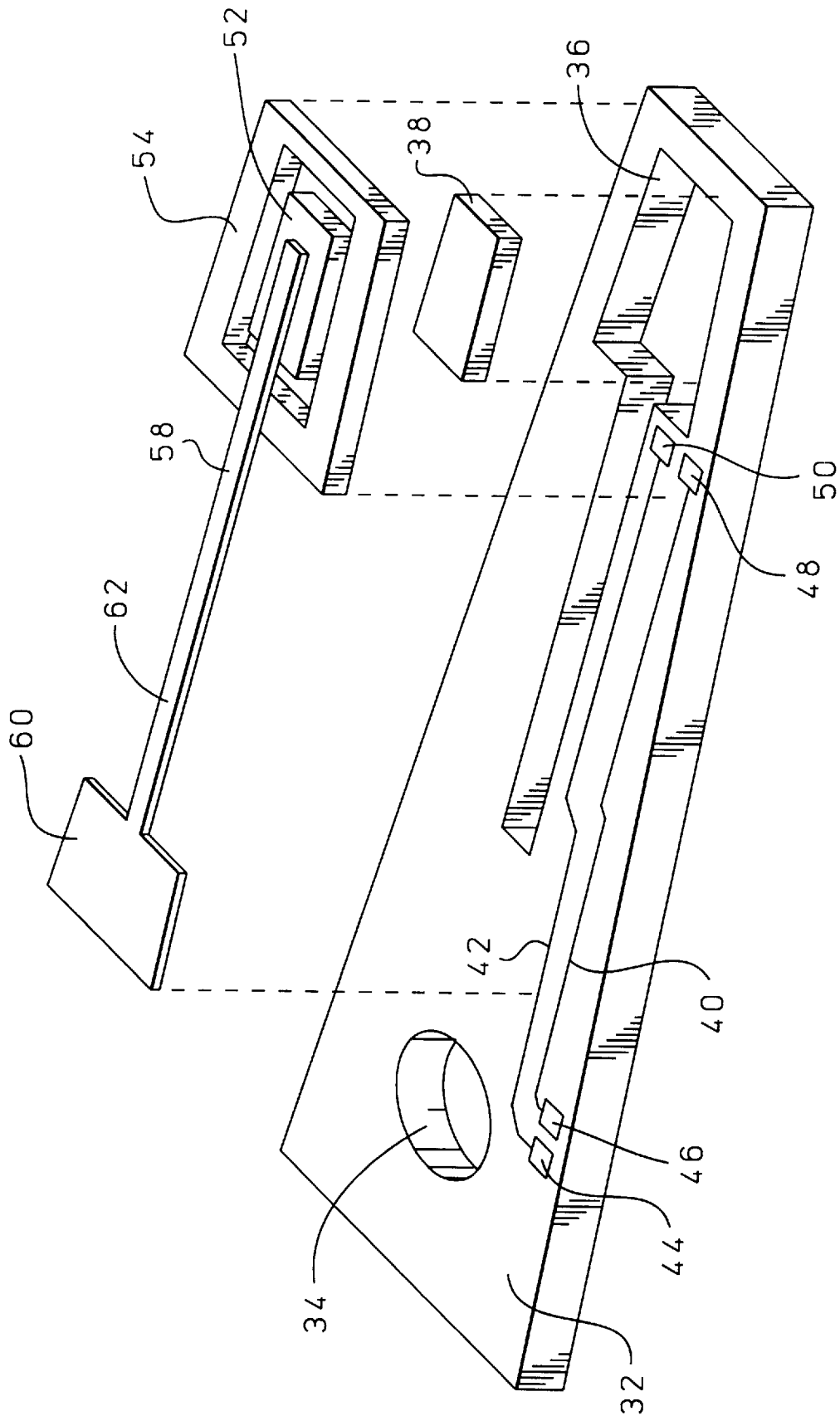
FIG. 4 is an exploded view of a magnetic head suspension assembly in accordance with the invention.
Figure 5:
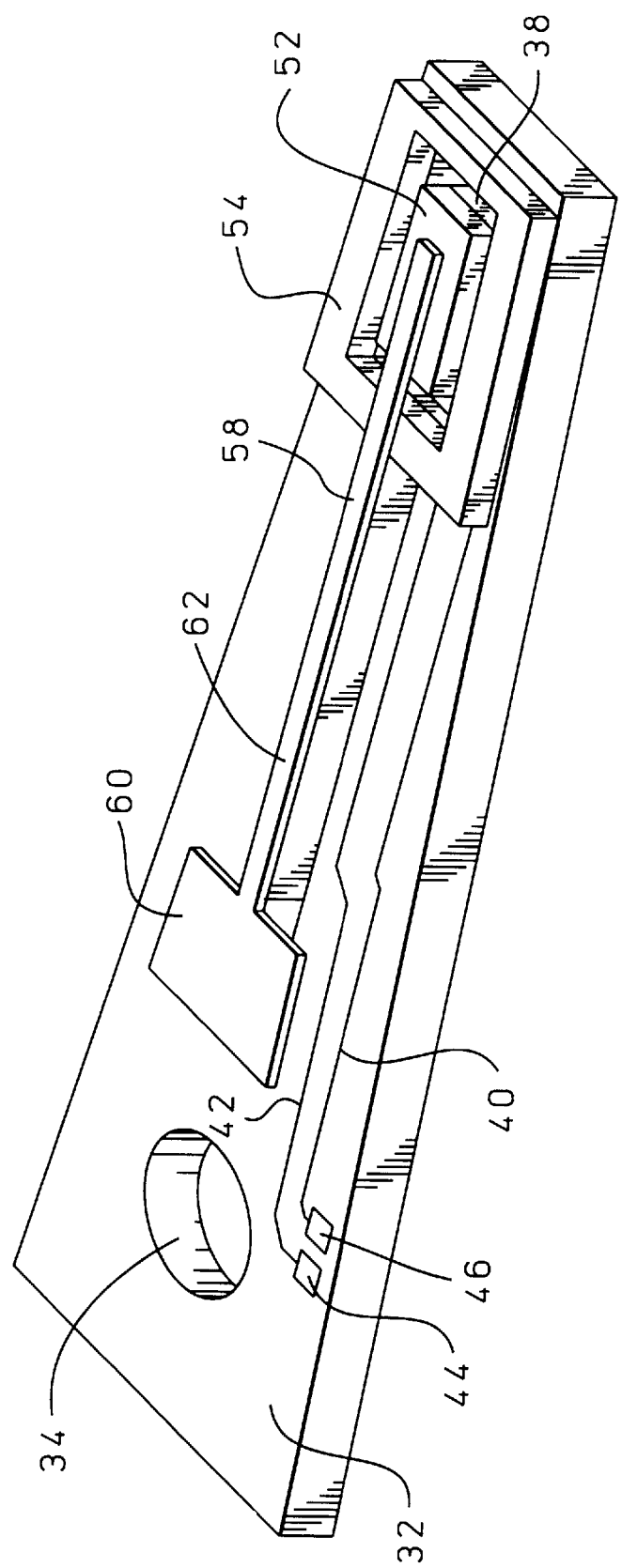
FIG. 5 is a perspective view of the assembly of FIG. 3.

Referring now to FIGS. 4 and 5, a substantially inflexible support arm 32 is shown as having a mounting end that includes an opening 34 for passage of mounting hardware or a pivot assembly. The support arm may be mounted to a conventional actuator arm stack of an actuator motor, or may be connected directly to the drive motor.

At a gimbal end of the support arm 32 is a trapezoidal opening 36 for mounting or otherwise accommodating an air bearing slider 38. The air bearing slider functions in a manner identical to prior art sliders. Thus, the counter forces of an aerodynamic lift force applied at a lower surface of the slider and a total load force applied at the top surface of the slider determine a slider-to-magnetic medium distance as the slider operates in a flying mode across a surface of a magnetic disk or other data-storage medium.

Fabricated onto the inflexible support arm are a pair of circuit board traces 40 and 42. While only a pair of traces is shown, a greater number of traces may be accommodated. While not critical, the support arm may be a ceramic member, with the traces being formed on the surface using known techniques for patterning thick films or thin films on a ceramic substrate. First input/output pads 44 and 46 are formed at the mounting end of the support arm. A flex circuit or other interconnection scheme may be connected to the input/output pads. At the gimbal end of the support arm are second input/output pads 48 and 50. As will be explained more fully below, data signals are transmitted from a transducer on a slider 38 to signal processing equipment via the traces 40 and 42. Optionally, traces may be fabricated on both sides of the support arm.

Figure 6:
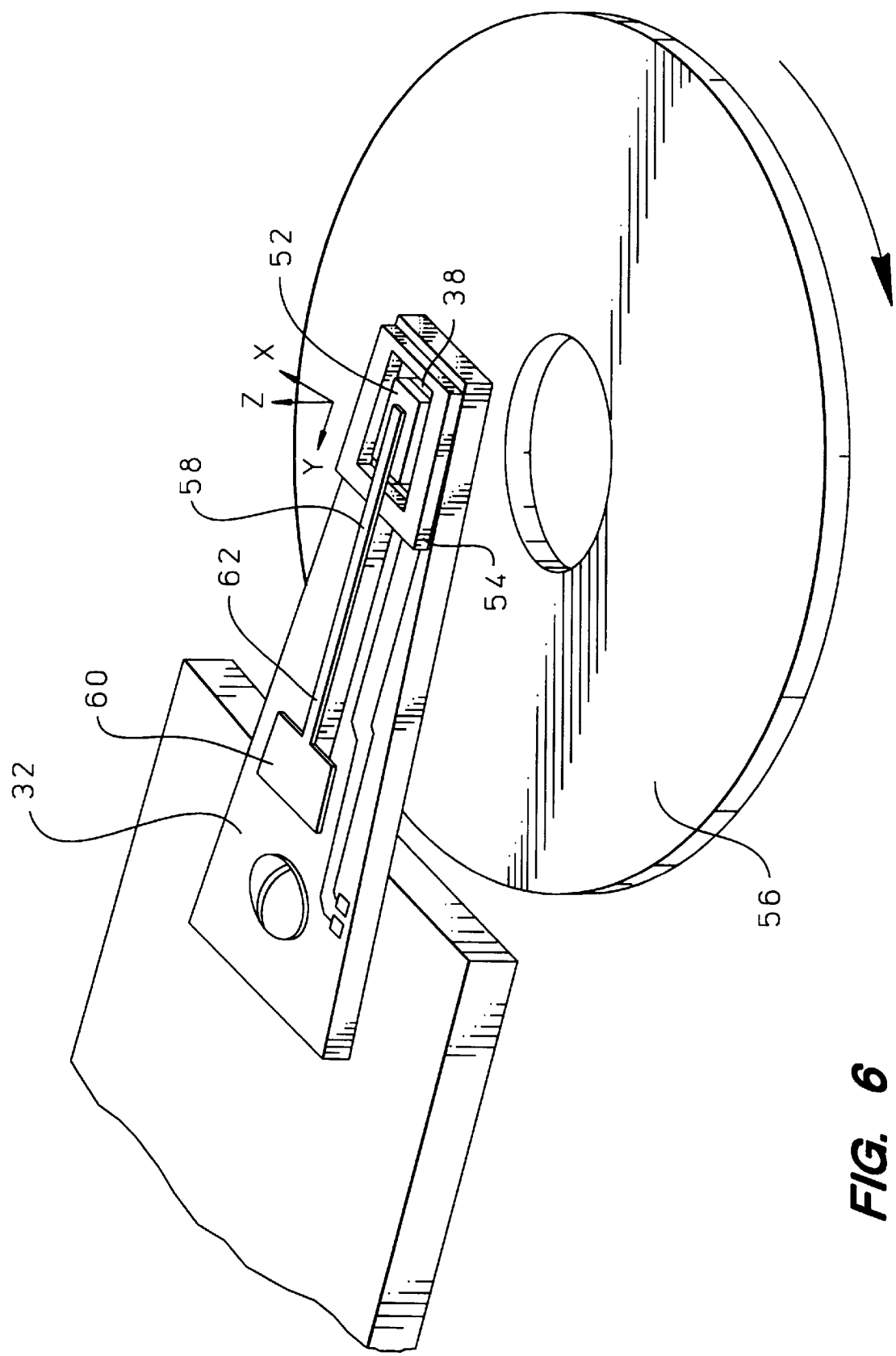
FIG. 6 is a perspective view of the assembly of FIG. 4 shown in operation.

The air bearing slider 38 is attached to a gimbal pendant 52. The gimbal pendant is attached to a gimbal frame 54 in a manner to achieve a number of desired mechanical stiffness characteristics. Referring now to FIG. 6, the slider 38 and the gimbal pendant 52 should have a low stiffness with regard to rotation about X and Y axes that are parallel to a surface of a magnetic disk 56. That is, the gimbal arrangement should accommodate rotation about the X axis, i.e. pitch, and rotation about the Y axis, i.e. roll, to allow the flying slider to follow the topography of the surface of the disk 56. However, the suspension assembly should have a high stiffness in the in-plane directions, i.e. should be resistant to lateral movement along either the X or Y axis. The suspension assembly should also be resistant to rotation about the Z-axis, i.e. resistant to yaw.

The gimbal pendant 52 should be connected to the frame 54 to be compliant in the Z-direction. In fact, ideally the gimbal should have no vertical stiffness. The force for pressing the slider 38 toward the magnetic disk 56 is primarily provided by a load spring 58. In the embodiment of FIGS. 4–6, the load spring is a leaf spring member. In the absence of a magnetic disk 56, the slider 38 extends significantly beyond the lower surface of the support arm 32. However, the presence of the disk establishes an equilibrium condition, so that the slider does not extend significantly below the surface of the support arm. In the case of a rotating disk, the equilibrium condition includes the lifting force of the air bearing.

The load spring 58 has a mounting region 60 and a bend region 62 close to the mounting region. Preferably, the bend region has a reduced thickness or a reduced width designed to isolate the spring deformation, thereby facilitating control of the spring stiffness. Beyond the bend region is a stiffer straight region of the load spring 58. The load spring 58 may be formed of metal. Acceptable techniques for forming the load spring include electroforming, precision stamping, and chemical etching.

Optionally, the load spring is integrally formed with the gimbal. In this embodiment, the single spring provides the vertical load force to the slider 38 and contributes to in-plane stiffnesses.

Figure 7:
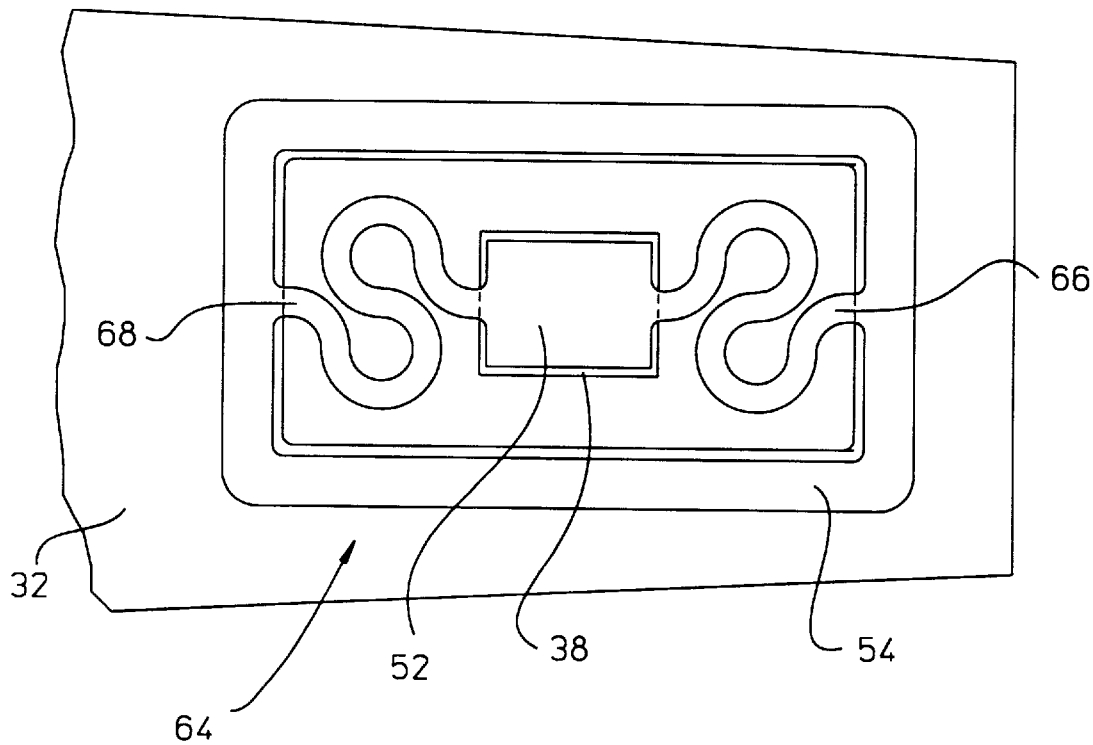
FIG. 7 is a top view of one embodiment of a gimbal of the assembly of FIG. 5.

Referring now to FIG. 7, a top view of a first embodiment of a gimbal 64 is illustrated. The gimbal may be formed of silicon using high precision micromachining techniques. A silicon gimbal is designed to be resistant to fracture during loading to a magnetic disk, as well as during hazards that may occur while the drive system is operating, e.g. externally applied shock, head/disk friction interaction, etc.

A pair of serpentine legs 66 and 68 connect the gimbal frame 54 to the gimbal pendant 52. It is this connection that defines the previously described mechanical stiffness characteristics. The load spring, not shown in FIG. 7, presses onto the top surface of the gimbal pendant and combines with the serpentine legs to press the slider 38 toward the disk. Returning briefly to FIG. 3, the serpentine legs are represented by the gimbal spring 26 that is parallel-coupled to the load spring 24 to bias the displaceable mass 30. The displaceable mass includes the mass of the slider 38 and the pendant 52, as well as a portion of the load spring 58.

Figure 8:
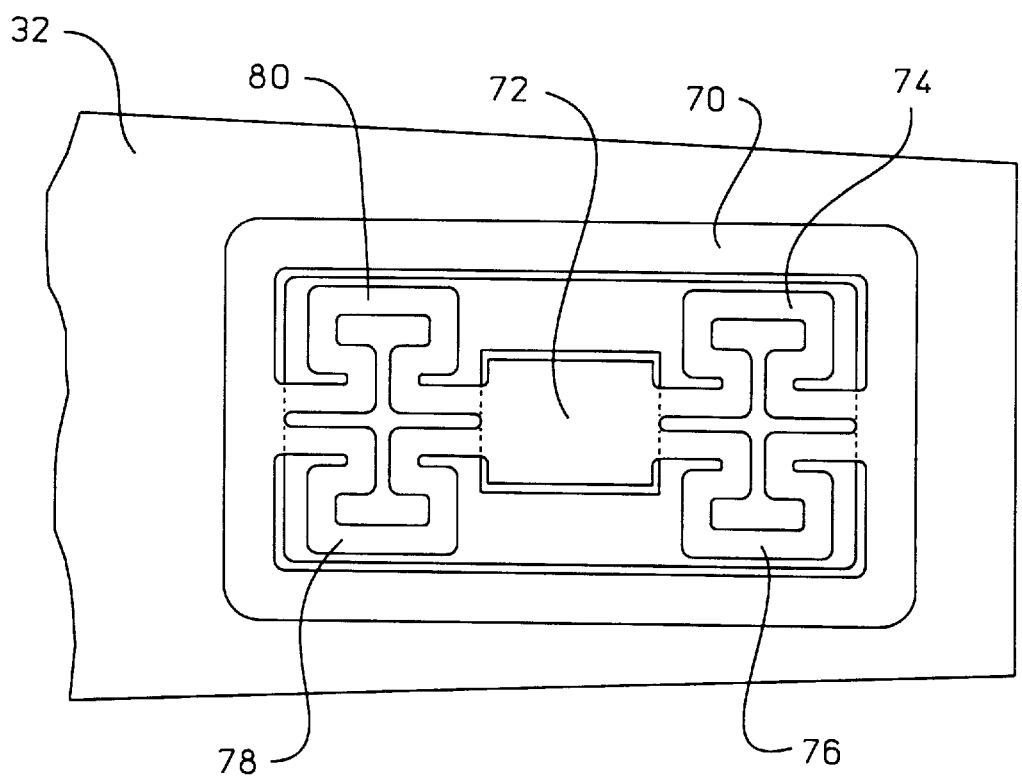
FIG. 8 is a top view of a second embodiment of a gimbal for the assembly of FIG. 5.

An alternative embodiment is shown in FIG. 8. In this embodiment, a gimbal frame 70 is linked to a gimbal pendant 72 by four serpentine springs 74, 76, 78 and 80. As compared to the embodiment of FIG. 7, the addition of two serpentine springs in the embodiment of FIG. 8 may be used to achieve desired mechanical characteristics, as is understood by persons skilled in the art. Other embodiments in which there are a greater or lesser number of gimbal springs and other configurations of the springs are also possible without departing from the invention.

Returning to FIGS. 4 and 5, the circuit board traces 40 and 42 extend to the second input/output pads 48 and 50, which are positioned below the gimbal frame 54 when the gimbal is secured to the support arm 32. Metallized traces may also be fabricated on the underside of the frame 54. The traces extend along one or more gimbal springs that connect the frame to the pendant 52. For example, in FIG. 7, two traces may be photolithographically formed on the underside of the silicon serpentine leg 68. The number of traces is limited only by the available area of the gimbal springs. From the gimbal pendant, the electrical connection may be made to the slider 38 by means of solder reflow techniques. Reflow of solder bumps is an attractive technique, since this process may be used to improve the repeatability of alignment between the gimbal pendant and the slider. Upon reflow of the solder, surface tension of the liquid solder pulls the slider into relatively close alignment with the pendant. Once the electrical connection has been made to the slider, conventional techniques may be used to provide an electrical connection to a read/write head on the slider.

A dimple, typically located on the gimbal pendant 52, is not shown in the figures. The dimple is used to accommodate pitch and roll motion of the slider 38 and to define the point of application of the load force. In the embodiment of FIGS. 4–6, the load spring is in the form of a leaf spring. In this arrangement, the end of the load spring is positioned on a dimple, which locates the load point with respect to the slider.

In an alternate embodiment, the load spring is attached to the inflexible support arm 32 at a region close to the gimbal pendant 52 and the slider 38. In this "localized" embodiment, deflection of the load spring may be constrained to motion along the Z axis. Thus, the load spring can be attached directly to the load point of the slider.

While the inflexible support arm 32 has been described as being a ceramic member, this is not critical. Alternatively, the support arm may be a metallic structure having the desired stiffness. Likewise, the gimbal may be formed of metal, polyimide or plastic rather than silicon.

We claim:

1. A head suspension assembly for supporting a magnetic head in a position to read data on a surface of a disk comprising:

a substantially inflexible support arm;

an air bearing slider having four sides;

a gimbal having a frame fixed to said support arm and having gimbal spring means for connecting said air bearing slider to said frame, said gimbal spring means being serpentine legs having frame-attachment ends that are connected to opposed sides of said frame and having slider-support ends that extend to said air bearing slider to provide compliance in a direction perpendicular to said surface of said disk, said frame-attachment end of each serpentine leg being on a same side of said air bearing slider as said slider-support end of said each serpentine leg, said serpentine legs being structurally independent of each other; and load spring means coupled between said support arm and said gimbal to exert a load force in said direction perpendicular to said surface;

wherein said gimbal establishes a relatively low stiffness to pitch and roll of said slider, said slider being in spaced relation to said surface of said disk, said spaced relation being an equilibrium condition in which said load and gimbal spring means provide counterforces relative to a force established by aerodynamic properties of said slider.

2. The assembly of claim 1 wherein said load spring means is a leaf spring extending from said support arm to said gimbal.

3. The assembly of claim 1 wherein said gimbal spring means and said load spring means are coupled in parallel to exert said counterforces onto said slider, said frame having four side segments that enclose said slider, each of said side segments corresponding to one of said sides of said slider, said serpentine leg extending from one of said side segments to an interior region defined within the planes of said sides of said slider.

4. The assembly of claim 2 wherein said leaf spring has a fixed end mounted to said support arm and a cantilevered end in contact with said gimbal.

5. The assembly of claim 4 wherein said leaf spring has a bend region between said fixed end and said cantilevered end.

6. The assembly of claim 1 further comprising signal traces printed on said support arm to conduct data signals along said support arm.

7. The assembly of claim 6 wherein said serpentine legs include conductive paths to further conduct said data signals.

8. A method of suspending a magnetic head in a position to read data on a surface of a disk comprising:

connecting a rigid support arm to an actuator motor of a drive system such that an end of said support arm opposite to said actuator motor is positioned to be adjacent to said disk;

attaching a gimbal to said end of said support arm to accommodate rotational motion about perpendicular axes that are each parallel to said surface of said disk, including providing said gimbal to include an outer frame and an inner slider-receiving pendant and serpentine legs extending from said frame to said pendant, said serpentine legs having frame-attachment ends and having slider-support ends that extend to said pendant, said serpentine legs being structurally independent of each other;

mounting an air bearing slider to said pendant of said gimbal such that said air bearing slider is separated from said surface of said disk by an air cushion and such that said slider-support end and said frame-attachment end of each serpentine leg are associated with a single side of said air bearing slider in traversing a distance from said frame to said pendant; and applying a load spring from said support arm to said gimbal such that said load spring and said serpentine legs collectively define a load force of said gimbal in a direction perpendicular to said surface of said disk, including applying said load force to accommodate maintaining said air cushion between said surface and said air bearing slider.

9. The method of claim 8 further comprising connecting said serpentine legs such that said pendant of said gimbal moves compliantly in said direction perpendicular to said surface of said disk.

10. The method of claim 8 further comprising mechanically and electrically connecting said air be slider to said pendant of said gimbal, including utilizing solder reflow techniques.

* * * * *